United States Patent [19]

Fisher et al.

[11] 4,188,156
[45] Feb. 12, 1980

[54] RISER

[75] Inventors: Edmund A. Fisher; Emanuel Schnitzer, both of Houston, Tex.

[73] Assignee: Cameron Iron Works, Inc., Houston, Tex.

[21] Appl. No.: 911,678

[22] Filed: Jun. 1, 1978

[51] Int. Cl.² .......................................... E21B 17/00
[52] U.S. Cl. .................................... 405/195; 166/367
[58] Field of Search .................... 405/195, 231, 185; 166/367, 350, 359; 175/7; 52/726

[56] References Cited

U.S. PATENT DOCUMENTS

| 3,605,413 | 9/1971 | Morgan | 405/211 |
| 3,768,842 | 10/1973 | Ahlstone | 166/367 |

FOREIGN PATENT DOCUMENTS 103969  3/1924  Switzerland .................... 52/726

Primary Examiner—Dennis L. Taylor
Attorney, Agent, or Firm—Vinson & Elkins

[57] ABSTRACT

A riser structure for connecting from a floating structure to a subsea wellhead for drilling or production which has an upper flexible steel section and a lower flexible section connecting from the wellhead to the upper steel section, the lower section, cantilevered from the wellhead, having an increasing flexibility in the upward direction and having a greater flexibility near its upper connection than the upper section. The lower section is preferably of a more flexible material, such as titanium, with a thinner wall at its upper end than at the lower end.

6 Claims, 3 Drawing Figures

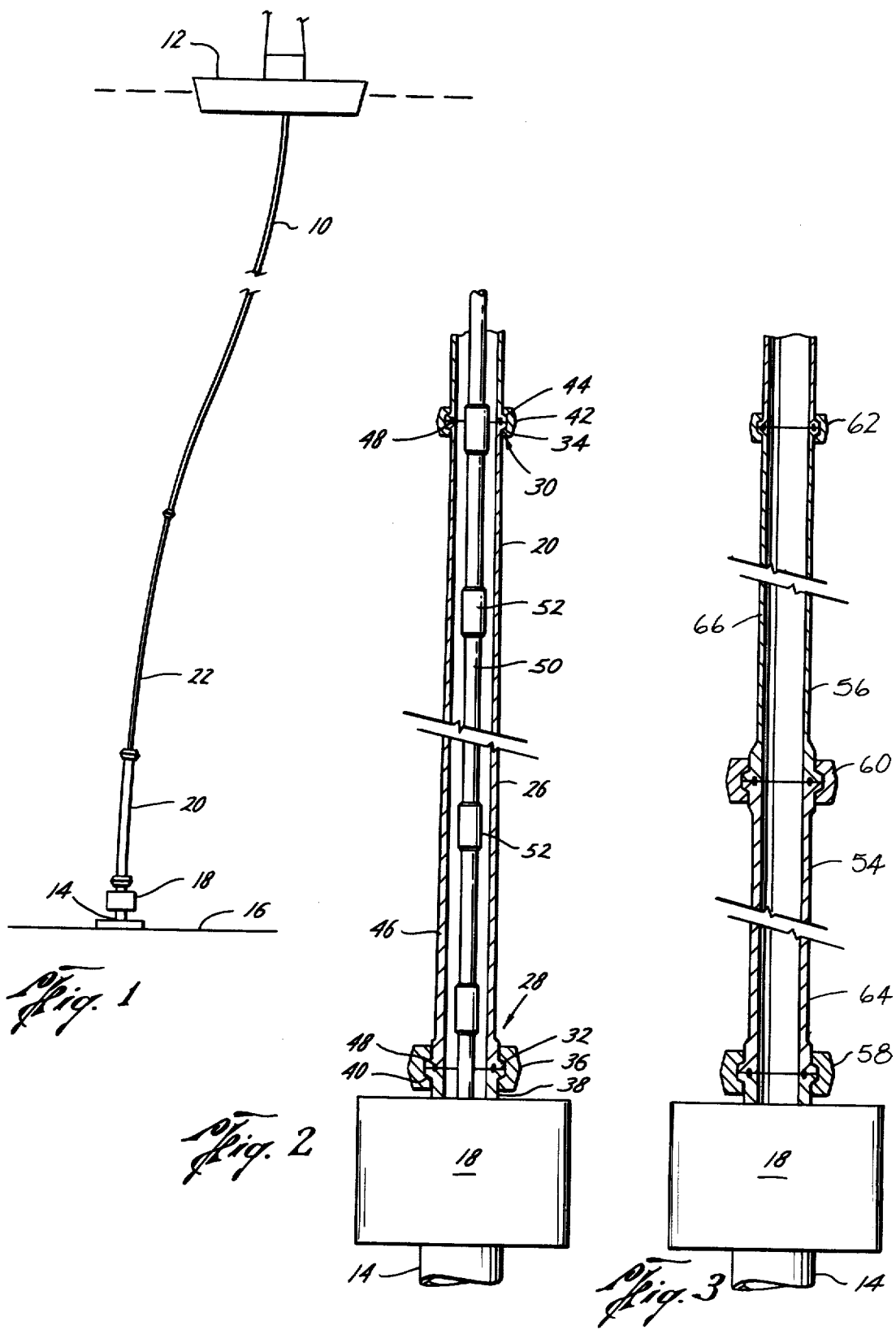

RISER

BACKGROUND

Risers are tubular structures which extend from a subsea wellhead to a floating structure and are used both for drilling through and producing from subsea wellheads. Such risers are subjected to deflection because of the movement of the floating structure responsive to wind, waves, tide and currents at the surface and to movement of the riser below the surface responsive to currents. The risers also are subjected to external and internal hydrostatic pressures and axial tension applied from the floating structure to prevent buckling of the riser, to reduce the stresses in the riser and to reduce the bending moment on the wellhead.

Various approaches have been suggested to provide risers with improved performance. Some have had articulated or resilient joints. (U.S. Pat. Nos. 3,168,334 and 3,189,372 to G. D. Johnson). Some have suggested a flexible riser (U.S. Pat. No. 3,424,253 to W. C. Triplett and U.S. Pat. No. 3,538,238 to J. Delacour et al) others have suggested caissions which extend from the bottom to above the surface and taper upwardly (U.S. Pat. No. 3,426,859 to W. F. Manning).

The G. W. Morgan U.S. Pat. No. 3,605,413 issued Sept. 20, 1971 discloses a riser having a varying rigidity in its lower section so that it is the stiffest at the subsea wellhead and increases in flexibility in the upward direction. The lower section of this riser includes a plurality of sections of gradually reduced thickness. This lower section is cantilevered to the wellhead.

All of these prior structures have disadvantages of being excessively expensive, create excessive flexural loads at the wellhead or require excessively close control of the tension on the riser.

SUMMARY

The present invention relates to an improved riser for connecting from a subsea wellhead. This improved riser includes a lower section of variable flexibility connected to the wellhead and an upper section having less flexibility than the portion of the lower section to which it connects.

An object of the present invention is to provide an improved riser having greater flexibility in its lower section than in its upper section relative to the applied bending moment.

Another object is to provide an improved riser which is compatible with well and drilling fluids and seawater and permits curvatures of internal tubing during severe sea state conditions so that the internal tubing is not loaded to failure.

A further object of this invention is to provide a riser with higher relative flexibility in its lower section whereby the wellhead member experiences a much lower, or greatly reduced, bending moment.

BRIEF DESCRIPTION OF THE DRAWINGS

These and other objects and advantages of the present invention are hereinafter set forth and explained with respect to the drawings wherein:

FIG. 1 is a schematic view of the improved riser of the present invention showing its connection to the wellhead and to the floating structure.

FIG. 2 is a detail sectional view of the preferred form of the lower riser section of the present invention with the inner tube extending therethrough.

FIG. 3 is a similar sectional view of a modified form of lower riser section of the present invention.

DESCRIPTION OF THE PREFERRED EMBODIMENTS

The improved riser 10 of the present invention extends from the floating structure 12 to the subsea wellhead 14 on the bottom 16. The riser 10 may be used for drilling or for production. When riser 10 is used for drilling, the drilling fluids and mud may be returned around the drill string within the riser 10. The use of the riser 10 for production may expose its interior to well fluids. In both uses, the interior of the riser 10 may be subjected to pressure differentials between the interior and the exterior. Thus, the riser must be compatible with or substantially unaffected by these fluids and sea water.

The riser 10 is connected to the wellhead 14 by the connector 18 which is preferably a collet connector. This connection is rigid so that the riser 10 is cantilevered from the wellhead 14. The riser 10 includes the lower flexible section 20 and the upper section 22. The lower section 20 has a varying flexibility being stiffest at the lower end and least stiff or most flexible at its upper end. The upper section 22 is relatively stiffer or less flexible than the upper end of lower section 20.

The preferred form of lower section 20 is shown in FIG. 2 and is a single tubular member 24 having a tapered wall 26 such that it is thickest at the lower end and gradually tapers toward the upper end. The ends 28 and 30 of member 24 have outwardly extending hubs 32 and 34. The clamp 36 joins the lower end 28 of member 24 to the spool 38 projecting from connector 18 by engaging hub 32 on end 28 of member 24 and hub 40 on spool 38. Similarly the clamp 42 joins the upper end 30 of member 24 to the lower end of upper section 22 by engaging hub 34 on end 30 of member 24 and hub 44 on section 22.

The ends 28 and 30 of member 24 are smoothly rounded into the hubs 32 and 34 to avoid sharp corners and the consequent concentration of stresses. Further the exterior has a coating 46 of a material such as neoprene to protect from damage and to minimize the surface area exposed to galvanic action. Suitable metal to metal seals 48 are provided at the joints.

Inner tubular member 50 is shown in FIG. 2 extending through the riser member 24. It may be the drill string for a drilling operation or tubing for a production operation. Resilient bumpers 52 surround inner member 50 at intervals to accommodate the different flexural radii of riser section 20 and member 50. The bumpers 52 are preferably of polyurethane rubber.

In FIG. 3 a modified form of the lower riser section 20 is shown to have two tubular members 54 and 56. The lower member 54 is secured to connector 18 by the clamp 58 and is connected to upper member 56 by clamp 60. Clamp 62 secures the upper end of member 56 to the lower end of upper riser section 22. Lower member 54 has a wall 64 of constant thickness throughout its length and upper member 56 also has a wall 66 of constant thickness throughout its length. Wall 66 is thinner than wall 64 so that upper member 56 has a greater flexibility than lower member 54.

The lower riser section 20 is intended to have a greater flexibility than upper riser section 22 but since it is subjected to greater bending moments it must be made from a material other than steel which is used for the upper section 22. This material has a greater degree of flexibility and is strong and corrosion resistant. The preferred material for section 20 is titanium alloy, such as 6A1-4V B processed.

An aluminum alloy, such as aluminium alloy 5052, temper H34 sold by Alcoa, may be used as the material for riser section 20.

The connections between the titanium sections and the steel sections may be separated with copper nickel alloy gaskets and spacers to prevent direct galvanic corrosion of the steel riser section 22.

Dynamic analyses supporting the titanium riser joint selection for conditions associated with a tethered, floating platform in rough sea operation have been made. They compare a steel riser of high stiffness near the base as disclosed in Morgan U.S. Pat. No. 3,605,413 with a titanium riser of low stiffness near the base as disclosed herein. The results are as follows:

|  | Conditions | |
|---|---|---|
|  | Normal Operating | 100-year Storm |
| Typical location - North Sea | | |
| Max. wave height | 49.2 ft. | 98.4 ft. |
| Max. wave period | 20 sec. | 20 sec. |
| Platform static offset from well centerline | 9.9 ft. | 32.8 ft. |
| Platform surge in waves | ±27 ft. | ±54 ft. |
| Water depth - 500 ft. | | |
| Platform height above water surface - 100 ft. | | |
| Riser Geometry | | |
| Lower Riser Joint | Steel | Titanium |
| Configuration | tapered wall | tapered wall |
| Length | 120 ft. | 30 ft. |
| Inside dia. | 8.54 in. | 8.54 in. |
| Wall thickness from base upward | | |
| base | 4.23 in. | 1.5 in. (Ti) |
| 30 ft. | 3.5 in. | .75 in. (Ti) |
| 60 ft. | 2.75 in. | .75 in. (Steel) |
| 90 ft. | 1.64 in. | .54 in. (Steel) |
| 120 ft. | .54 in. | .54 in. (Steel) |
| Upper Riser | | |
| 120 ft. to 600 ft. | .54 in. | .54 in. (Steel) |
| Yield Strength | 75,000 psi* | 115,000 psi (Ti) |
| Modulus of Elasticity | 30,000,000 psi | 16,500,000 psi (Ti) |
| Resulting Maximum Moments | | |
| base | 1,693,000 ft. lb. | 606,000 ft. lb. |
| 30 ft. up | 1,100,000 ft. lb. | 111,465 ft. lb. |
| Mid Riser | 38,200 ft. lb. | 21,851 ft. lb. |
| Resulting Maximum Stresses | | |
| base | 45,700 psi | 71,236 psi |
| 30 ft. up | 39,000 psi | 33,153 psi |
| Mid Riser | 18,800 psi | 17,500 psi |
| Fatigue Life | | |
| Normal operating | 7 years | 20 years |
| 100-year storm | Marginal | Acceptable |

*Typical max value compatible with H₂S gas service and welding considerations.

While the stresses in the titanium riser joint are higher, the life expectancy is longer because of the higher yield strength and higher endurance limit stress of the titanium. The base bending moment applied to the wellhead by the titanium riser joint is only about 42 percent of that of the steel joint. Thus, the titanium joint permits much lighter components to be used at the wellhead connection. The titanium joint has only 25 percent of the length of the steel joint and 35 percent of the wall thickness of the steel joint at its base.

The unique design of the present invention includes a lower riser stress joint with a low flexural modulus, e.g., titanium or aluminum alloy. The vertical riser is a cantilever beam completely restrained at the sea bottom with applied side forces from water drag and vessel motions. Since the tubular riser has a uniform cross-section and is a uniformly loaded cantilever beam, both the bending moment and bending stress increase near the bottom of the riser.

The prior solutions to this problem suggested an increase of the moment of inertia near the base as in conventional flagpole design. (See the Morgan U.S. Pat. No. 3,605,413). Such design attempts to reduce the bending stress near the base to approximate a more or less constant stress beam. The disadvantage of this design is that the base of the riser has an exceptionally high spring rate which leads to extreme bending moments on the wellhead and a very heavy riser.

The present invention approaches this problem by reducing the spring rate near the riser base through the use of a material with a low modulus of elasticity, e.g., titanium or aluminum alloy, rather than increasing the moment of inertia in this region. This has the effect of permitting the bending energy to be absorbed near the riser base in a large deflection rather than a high stress, and results in greatly reduced bending moments throughout the riser. Since the titanium has a higher yield strength than the usual steel riser, the overall allowable flexure near the riser base is further increased, permitting a thin, short flexible section to be used near the riser base instead of a thick, long steel flagpole. By taking advantage of a lower Young's modulus for the material rather than having to modify the geometric property of the section, the titanium alloy stress joint serves to provide a member as strong as but much more flexible than a steel member designed for the same conditions.

Thus, the substitution of a thin titanium joint in place of a heavy steel flagpole section results from varying the modulus of elasticity of the material rather than changing the section geometry to keep stresses within allowable limits.

What is claimed is:

1. A riser adapted to extend from a subsea wellhead to a structure at the water surface comprising
   a lower section having means for connecting to the subsea wellhead, and
   an upper tubular section having means for connecting to the lower section and to the surface structure,
   said lower section having a smaller cross sectional area at its upper end whereby it has an increased flexibility at its upper end as compared with its lower end,
   the upper end of said lower section being of a less rigid material than the upper section whereby it has a greater flexibility than said upper section whereby a substantially longer life expectancy of the riser is achieved.

2. A riser according to claim 1, wherein
   said lower tubular section has a wall thickness tapering to smaller in the upward direction.

3. A riser according to claim 1 wherein
   said lower tubular section includes
   a lower tubular member,
   an upper tubular member, and
   means connecting said members, said lower tubular member having a wall thickness greater than the wall thickness of said upper tubular member.

4. A riser according to claims 1, 2 or 3 wherein said lower tubular section is made of titanium and said upper tubular section is made of steel.

5. A riser according to claims 1, 2 or 3 wherein said lower tubular section is made of an aluminum alloy and said upper tubular section is made of steel.

6. A riser adapted to extend from a subsea wellhead to a structure at the water surface comprising
 a lower tubular section having means for connecting to the subsea wellhead, and
 an upper tubular section having means for connecting to the lower section and to the surface structure,
 said lower section being of a material having a substantially lower modulus of elasticity than the material of said upper section whereby a longer life expectancy of the riser is provided.

* * * * *